United States Patent

[11] 3,627,063

| [72] | Inventor | Edward Clyde Ryan<br>Ankeny, Iowa |
|---|---|---|
| [21] | Appl. No. | 874,858 |
| [22] | Filed | Nov. 7, 1969 |
| [45] | Patented | Dec. 14, 1971 |
| [73] | Assignee | Deere & Company<br>Moline, Ill. |

[54] ROTARY HOE
11 Claims, 2 Drawing Figs.

[52] U.S. Cl............................................. 172/627,
172/462, 172/518, 172/570, 172/572
[51] Int. Cl....................................... A01b 35/28,
A01b 39/08
[50] Field of Search........................................... 172/518,
519, 49, 51, 117, 111, 123, 544, 551, 573, 572,
462, 621, 627, 643, 570

[56] References Cited
UNITED STATES PATENTS

| 928,029 | 7/1909 | Craig.............................. | 172/572 |
|---|---|---|---|
| 1,053,095 | 2/1913 | Iverson........................... | 172/462 |
| 1,115,839 | 11/1914 | Kramer.......................... | 172/572 X |
| 1,240,542 | 9/1917 | Cassell........................... | 172/49 |
| 1,331,722 | 2/1920 | Remy............................. | 172/572 X |
| 1,386,132 | 8/1921 | Rodemeyer................... | 172/572 X |
| 1,639,307 | 8/1927 | Neu................................ | 172/572 X |
| 2,839,980 | 6/1958 | Evans et al.................... | 172/627 X |
| 3,245,479 | 4/1966 | Dlugosch et al.............. | 172/643 X |
| 3,260,315 | 7/1966 | Day................................ | 172/643 X |

*Primary Examiner*—Robert E. Pulfrey
*Assistant Examiner*—R. T. Rader
*Attorneys*—H. Vincent Harsha, Harold M. Knoth, William A. Murray, John M. Nolan and Raymond L. Hollister ABSTRACT: A plurality of transverse sets of tandem gangs of hoe wheels are individually mounted on a toolbar by leaf springs which will transfer the weight of the toolbar to the gangs and allow a high degree of flexibility between the sets of gangs and between the gangs of a single set so that the gangs can follow the ground contour. Each set of gangs is mounted on a subframe which in turn is mounted on a first leaf spring for rotational movement about a fore-and-aft extending axis so that the subframes can pivot to the side and conform to the contour of the ground when working bedded crops. The first leaf spring is pivotally connected to one end of a second leaf spring which has its opposite ends rigidly secured to the toolbar. A draft link extending between each subframe and a toolbar relieve the leaf springs of draft forces.

Patented Dec. 14, 1971

3,627,063

INVENTOR.
E. C. RYAN

ROTARY HOE

BACKGROUND OF THE INVENTION

The present invention relates generally to rotary hoes and more particularly relates to rotary hoes for working bedded or listed crops.

Tillage implements used with the modern high-horsepower tractors must cover a large area so that the power of the tractor is fully utilized, must be sufficiently flexible to follow the ground contour over their entire width, must have the ability to pass over damaging obstructions such as rocks, and, in the case of integral or semi-integral implements, must have sufficient weight for ground penetration, but still be light enough to be safely lifted with a tractor three-point hitch. Until recently, there were no rotary hoes which met all of these requirements. Many designs for rotary hoes partially met the flexibility requirement, but fell short on the size and weight requirements. Other designs met the weight requirement, but fell short on the size and flexibility requirements.

A rotary hoe which meets all of the requirements listed above is disclosed and claimed in applicant's copending U.S. application Ser. No. 778,982. The designs for a rotary hoe illustrated therein embody an entirely new concept in mounting rotary hoes on a toolbar and represent the first major change in rotary hoes since they were first designed to be drawn by horses. The present invention is related to the invention set forth in applicant's copending application in that it embodies the inventive concept disclosed and claimed therein and sets forth additional improvements for rotary hoes which are primarily useful for working bedded or listed crops.

SUMMARY OF THE INVENTION

The primary object of the present invention is to provide a rotary hoe for working bedded or listed crops which is of light weight, highly flexible, and in which the weight of the main frame can be transferred to the gangs of hoes.

A further object of the present invention is to provide a rotary hoe for working bedded or listed crops in which a set of tandem gangs is resiliently suspended from a toolbar by leaf springs which will transfer the weight of the toolbar to the gangs to provide sufficient down pressure when working and will resiliently support the gangs for transport purposes, and in which each set of gangs is linked to the toolbar by a draft link which will transfer the draft forces of each set of gangs to the toolbar.

Still another object of the present invention is to provide a rotary hoe for working bedded or listed crops in which each set of tandem gangs is mounted on a light subframe which in turn is resiliently suspended from a toolbar by flat springs, and in which each subframe is mounted for limited rotational movement about a fore-and-aft extending axis.

The above objects and additional objects and advantages will become apparent along with the details of construction of the preferred embodiment of the invention from a reading of the following detailed description taken in conjunction with the accompanying drawing.

DESCRIPTION OF THE PREFERRED EMBODIMENT

Figure 1:
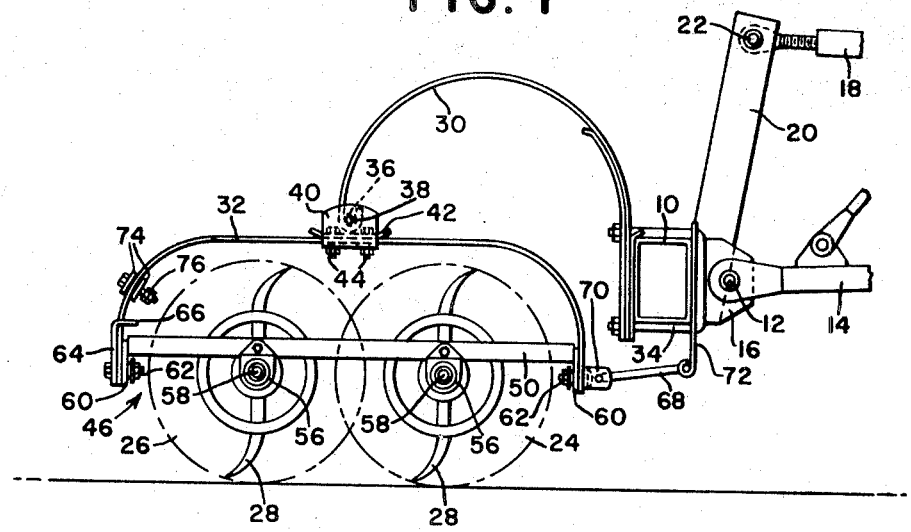
FIG. 1 is a side elevational view of a rotary hoe embodying the principles of the present invention.
Figure 2:
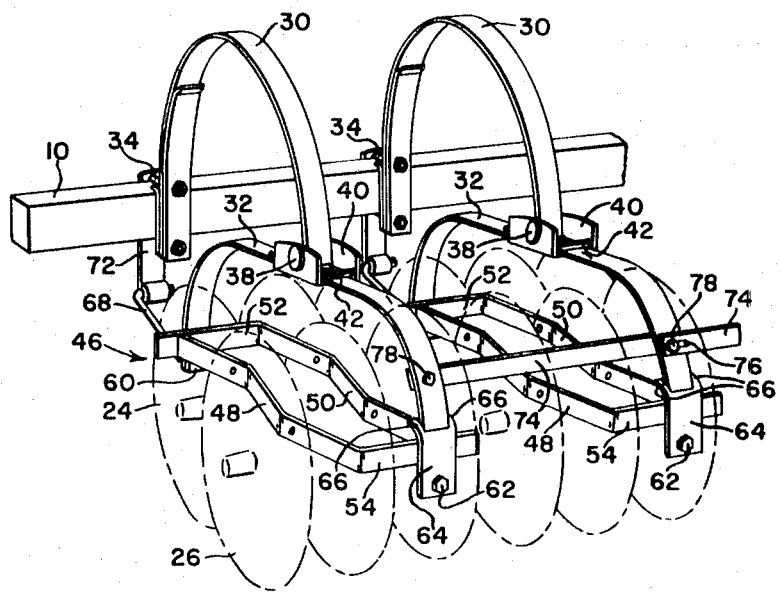
FIG. 2 is a perspective view of a portion of the rotary hoe illustrated in FIG. 1.

Referring now to the drawing, the rotary hoe disclosed therein includes a transversely extending main frame or toolbar 10 which is provided with a pair of transversely spaced and transversely extending hitch pins 12 which are adapted to extend through the conventional apertured balls carried by the trailing end of the draft links 14 of the three-point hitch on a conventional tractor. The hitch pins 12 are carried by brackets 16 which are secured to the forward side of the toolbar in any suitable manner such as with clamps or by welding. The upper link 18 of the tractor three-point hitch is connected to the upper end of a mast 20 by a pin 22. The lower end of the mast 20 is secured to the forward side of the toolbar in a position between the lower hitch pins 12. When the lower and upper links 14 and 18 of the tractor three-point hitch are connected to the lower and upper hitch pins 12 and 22, the toolbar 10 is integrally mounted on the tractor three-point hitch so that the toolbar 10 is raised and lowered with movement of the tractor three-point hitch.

A plurality of transversely aligned sets of front and rear gangs 24 and 26 of hoe wheels 28 are each suspended from the toolbar 10 by leaf springs or flat spring members 30 and 32. The leaf springs 30 are generally of inverted U-shape and each has one leg secured to the toolbar 10 by a U-bolt 34. The rearwardmost end of each leaf spring 30 is provided with a reverse bend within which a bushing 36 is secured. The bushing 36 serves to receive a pivot pin 38 which pivotally mounts the second leaf spring 32 to the rearwardmost end of the leaf spring 30. Each of the leaf springs 32 is also of generally inverted U-shape and has a U-shaped bracket 40 secured to its bight. A portion of the bight of each of the springs 32 is clamped between the bight of the U-bracket 40 and a strap 42 by bolts 44. The legs of the U-bracket 40 are suitably apertured so that the pivot pin 38 extends through the apertures provided in the legs of the U-bracket 38 and through the bushing 36 carried by the spring 30.

Each set of front and rear gangs 24, 26 is mounted on a light subframe indicated generally at 46. Each subframe consists of a pair of spaced fore-and-aft extending frame members 48 and 50 which are joined together at their ends by transverse extending frame members 52 and 54. Bearings 56 are secured to and depend from the frame members 48 and 50 and rotatably carry the gang shafts 58 which in turn rotatably carry the hoe wheels 28. Each of the fore-and-aft extending frame members 48 and 50 is provided with a double bend intermediate its ends so that the opposite ends of each subframe 46 are offset and the wheels of the rear gang 26 are offset with respect to the wheels of the forward gang 24. With the wheels of the gangs offset, the rear wheels work the strips of earth between the forward wheels and the wheels can be mounted in overlapping relationship so that the length of the subframes can be reduced and the wheels of each set of gangs prevent earth from building up between the wheels of the other gang of the set.

The transversely extending frame members 52 and 54 are provided with apertured ears 60 which serve to mount the subframes 46 on the depending ends of the springs 32. The subframes 46 are pivotally secured to the springs 32 by bolts 62 which extend through apertures provided in the depending ends of the springs 32 and through the apertured ears 60. The subframes 46 are free to pivot about the bolts 62 so that each individual set of gangs can conform to the slope of the lister or bedder rows. However, to prevent excess rotation of the subframes about the bolts 62, a stop plate 64 is secured to the rear leg of each of the springs 32 by the bolts 62. Each of the stop plates 64 is provided with a pair of ears 66 which are bent forwardly to a position in which they overlie the rear transverse frame member 54 of the corresponding subframe.

The draft forces of the hoe wheels of each set of gangs are transferred to the toolbar by a draft link 68. The rear end of each draft link 68 is pivotally connected to a bracket 70 which is pivotally secured to the forward end of the corresponding subframe by the forward bolt 62. The forward end of each draft link 68 is pivotally connected to the lower end of a strap 72 which is secured to the forward face of the toolbar 10 by the U-bolt 34 which mounts the corresponding set of gangs on the toolbar. The draft links 68 transmit the draft forces which would otherwise be transmitted through the springs 30 and 32 and also prevent the gangs from pivoting rearwardly about the pivot pins 38.

To prevent lateral deflection of any one or more of the gangs, the rear legs of each pair of adjacent springs 32 are loosely connected together by rigid links 74 which are provided with elongated slots 76 at their opposite ends. The links 74 are connected to the springs 32 by bolts 78 which extend through the slots 76 and through suitable apertures provided in the rear legs of the springs 32. If one of the sets of gangs is deflected laterally, the links 74 prevent any one set of gangs from being deflected a distance greater than is allowed by the elongated slots 76 since once the ends of the slots have been reached, the deflecting force will also be resisted by an adjacent gang or gangs. However, the individual sets of gangs are still free to move vertically independently of the movement of other gangs due to the lost motion provided by the slots 76.

In use, the rotary hoe is lowered by the tractor three-point hitch and the weight of the toolbar 10 is transferred through the springs 30 and 32 to the hoe wheels 28 so that there is sufficient weight on the hoe wheels to achieve the desired earth penetration. As the rotary hoe is drawn forwardly by the tractor, the resistance of the hoe wheels 46 to movement through the soil is taken up by the toolbar 10 through the draft links 68. Since the gangs 24 and 26 are mounted on the toolbar 10 through the springs 30 and 32 and are mounted on the spring 32 for rotational movement about a longitudinal axis as defined by the bolt 62, they are free to conform to the soil contour over the entire width of the implement and each gang can move over an obstruction without raising the other gang. For example, should one of the front gangs hit a rock, it will tend to raise upwardly deflecting the rearward end of the spring 30 upwardly. However, as the front gang moves upwardly, it will pivot the spring 32 about the pin 38 and cause a corresponding downward movement of the rear gang 26, and the downward movement of the rear gang 26 will substantially offset the upper deflection of the spring 30. Also, since each set of tandem gangs is individually mounted on the toolbar 10, the vertical deflection of any gang will have substantially no affect on any of the laterally adjacent gangs.

Although only a single embodiment of the invention has been described and illustrated, various modifications within the spirit and scope of the invention will become apparent to those skilled in the art and can be made without departing from the underlying principles of the invention.

I claim:

1. A rotary hoe comprising: an elongated frame member extending transversely to the normal direction of travel of the rotary hoe; means on the frame member for connection with a propelling vehicle; a plurality of transversely aligned sets of front and rear gangs of hoe wheels; each set of front and rear gangs being mounted on a subframe having front and rear ends; and means individually and resiliently suspending each subframe from the frame member; each of the last-mentioned means including an inverted generally U-shaped member having the lower ends of its legs pivotally connected to the front and rear ends of the respective subframe for rotational movement of the subframe relative to the U-shaped member about a fore-and-aft extending axis and its bight position above and spanning the respective set of gangs, and a leaf spring connecting each U-shaped member to the frame member, each leaf spring having one end rigidly connected to the frame member and its other end connected to the bight of the U-shaped member.

2. The rotary hoe set forth in claim 1 wherein stop means cooperate between the subframes and U-shaped members to limit the movement of the subframes about the fore-and-aft extending axes.

3. The rotary hoe set forth in claim 2 wherein each of the leaf springs is pivotally connected to the bight of its respective U-shaped member.

4. The rotary hoe set forth in claim 3 wherein a draft link means extends between and is pivotally connected to each subframe and the frame member.

5. The rotary hoe set forth in claim 4 wherein each of the U-shaped members is interconnected with each adjacent U-shaped member by transversely extending link means which include lost-motion means whereby the movement of each U-shaped member independently of the movement of the other U-shaped members is limited.

6. The rotary hoe set forth in claim 5 wherein each of the U-shaped members is constructed of a resilient flat strap.

7. The rotary hoe set forth in claim 3 wherein each of the leaf springs is of inverted U-shape in its relaxed condition and has its bight positioned above the corresponding U-shaped member.

8. A rotary hoe comprising: a toolbar adapted to be connected to a propelling vehicle; a set of tandem gangs of hoe wheels mounted on a subframe having front and rear ends and positioned rearwardly of the toolbar; and means resiliently suspending the subframe from the toolbar; the means including a support member spanning the set of tandem gangs and having opposite ends pivotally connected to the front and rear ends of the subframe for rotational movement of the subframe relative to the support member about a fore-and-aft extending axis and a flat spring member having opposite ends connected to the toolbar and to the support member.

9. The rotary hoe set forth in claim 8 wherein stop means act between the support member and subframe to limit the rotational movement of the subframe.

10. The rotary hoe set forth in claim 9 wherein the flat spring member is pivotally connected to the support member and a draft link means extends between and is pivotally connected to the subframe and toolbar.

11. The rotary hoe set forth in claim 10 wherein the support member is an inverted U-shaped flat spring, has its legs pivotally connected to the ends of the subframe and its bight positioned above and spanning the gangs, and the flat spring member is pivotally connected to the bight of the flat spring.

* * * * *